Patented June 30, 1936

2,046,166

UNITED STATES PATENT OFFICE 2,046,166

VANADIUM CATALYST

Leon E. Jenks, Jackson Heights, N. Y., assignor to General Chemical Company, New York, N. Y., a corporation of New York No Drawing. Application June 30, 1933,
Serial No. 678,476

5 Claims. (Cl. 23—234)

This invention relates to catalysts, the manufacture thereof, and to the utilization of the same in catalytic conversion reactions. Generally speaking, the invention is directed to the production of vanadium catalysts capable of catalytically effecting gas-phase reactions, and more particularly, the invention is concerned with vanadium catalysts suited for use in connection with the formation of sulfuric anhydride from gases containing sulfur dioxide and oxygen by the contact process. In the more specific aspects, the invention relates to vanadium catalysts made directly from vanadium ores.

One of the principal objects of the invention resides in the provision of a method for making vanadium catalysts utilizing vanadium ores as major constituents of such catalysts and as a source of catalytically active vanadium. A further object of the invention lies in the provision of vanadium catalysts made directly from vanadium ores, which catalysts are of such character as to give commercially efficient conversions, as for example, of sulfur dioxide-oxygen gas mixtures to sulfur trioxide by the contact process in the manufacture of sulfuric acid. It is another object of the invention to simplify methods for the manufacture of vanadium catalysts to such extent that prior art procedure generally employed for the purpose of separating vanadium from its ores and converting the vanadium to an active form adaptable for use in catalysts may be simplified.

As a result of investigations upon which the invention is based, it has been found that a commercially efficient vanadium catalyst may be made directly from vanadium ores, even where such ores have a comparatively low vanadium content, by utilizing at least part of the vanadium content of the ore as a source of the catalytically active vanadium in the product.

It is known that vanadium ores may comprise relatively complex material. Apparently any element or compound which would inhibit the activity, as an oxidation catalyst, of the vanadium compound or compounds present in the finished product has been removed or at least neutralized by the present process for preparation of the active mass. This has been demonstrated by high conversion results obtained. It is to be expected that any material in the ore capable of becoming an oxidation catalyst when treated in accordance with the several examples given herein will beneficially influence the catalytic activity of the product.

Furthermore, some vanadium ores may contain elements and/or compounds, such as uranium, which under the methods of preparation of the catalytically active mass disclosed below, become promoters or activators of the material comprising the catalyst. It is not fully known how such promotion or activation takes place.

The invention further contemplates inclusion of one or more alkali metal compounds in the catalytic product, such substances apparently acting as promoters and aiding in the conversion of vanadium to active form and in the distribution of vanadium throughout the mass.

Generally speaking, the process of the invention comprises preferably initially grinding or pulverizing the ore to finely divide the same, decomposing vanadium compounds contained in the ore and converting at least some of the vanadium to a more active form than that in which it exists in the raw ore, distributing active vanadium and any other possibly unconverted vanadium salts over material, such as silicious material, constituting a large part of the ore, so that material of the mass probably acts as a carrier for the catalytically active vanadium and other vanadium salts, incorporating one or more alkali metal compounds into the mix to provide in the product alkali sulphates or pyrosulfates to facilitate further possible decomposition of vanadium salts, drying the catalytic mass, and sulfating the same in an oxygen-oxides of sulfur atmosphere prior to actual use in commercial operations.

The invention particularly comprehends the use of comparatively low-grade vanadium sandstone ores found in the United States, particularly in Colorado. A vanadium-mica ore, known as roscoelite, is one such ore, and other sandstone ores containing vanadium in admixture with more or less carnotite may also be suitable. Ores of the kind adapted for use in accordance with the invention may, as a rule, contain from about 2 to 10% vanadium expressed as $V_2O_5$, an average ore containing around, say 4–6% vanadium, reported as $V_2O_5$. Higher grade ores or concentrates containing up to about 20 to 25% vanadium, as $V_2O_5$, may also be suited for the purposes of the invention, although the lower grade ores running less than about 10% are preferred. By way of example, it may be stated that one vanadium ore from which a satisfactory catalyst was directly produced analyzed substantially as follows:

| | Per cent |
|---|---|
| Vanadium, as $V_2O_5$ | 5.03 |
| Silicon, as $SiO_2$ | 75.70 |
| Iron, aluminum and titanium as $Fe_2O_3+Al_2O_3+TiO_2$ | 8.60 |
| Calcium, as CaO | 1.93 |
| Magnesium, as MgO | 1.78 |
| Sodium, as $Na_2O$ | 2.69 |
| Potassium, as $K_2O$ | 1.07 |
| Phosphates | Trace |
| Loss on ignition | 2.98 |
| Total | 99.78 |

In accordance with the invention the ore is initially ground preferably to around say 300 mesh, most satisfactory results generally being obtained when the ore is thus finely divided. The ore may or may not be subjected to a preliminary roasting. When roasting is desirable, dependent more or less on the character of the particular ore involved, this preliminary treatment may be effected before or after grinding, although the latter is preferred. It has been found, generally speaking, that roasting tends to improve the activity of the catalyst, possibly for the reason that roasting acts to stabilize the material and drive off substances, such as carbonaceous matter, which may have a deleterious effect on the catalytic activity of the product. In instances where the ore is initially roasted, temperatures lower than those at which incipient fusion takes place are preferred. Temperatures higher than below incipient fusion temperature have a tendency to make it more difficult to activate the vanadium.

Further procedure in the process consists in subjecting the ore to a suitable treatment to convert at least some of the vanadium contained in the ore to a more active form than that in which it exists in the raw ore, and to apparently cause distribution of catalytically active vanadium throughout the material constituting the mass. It is thought the effect of such treatment is to decompose or break down vanadium compounds initially of low catalytic activity. Whatever the chemical reactions involved may be, the result appears to be the conversion of at least some of the vanadium contained in the ore to a more active condition. The incorporation of alkali metal compounds in the catalyst provides in the product alkali metal sulfates or pyrosulfates which, on heating the catalyst and particularly on use thereof in the converter, seems to further or complete the conversion of vanadium salts to active form. It is understood, of course, that the invention is not dependent upon the accuracy of the suggested reactions involved.

It has been found that the initial conversion of vanadium from the state in which it exists in the ore to a more active form may be effected in various ways.

It has also been found that the desired change in the form of the vanadium may be accomplished by a dry method in which the ground ore is heated, preferably at tempertures just below sintering, with alkali metal salts, such as alkali chloride, carbonate or sulfate or mixtures of these. The following is an illustrative example of such operation.

*Example 1.*—Preheat ore, containing 3.83% vanadium as V₂O₅ and ground to pass 300 mesh, to about 900° C. To 500 parts of the cooled preheated ore, add 40 parts of potassium carbonate. The well mixed materials are then heated for one hour at 760–780° C. When cooled, add a solution containing 5 parts of potassium hydroxide and enough excess water to just thoroughly wet the material to incipient stickiness. Allow the material to harden at room temperature and then sulfate in air-sulfur dioxide-sulfur trioxide gas mixture at gradually increasing temperatures to about the temperature at which the material will be used in the converter.

In utilizing the catalysts of the present invention in catalytic conversion operations, for example, in the oxidation of sulfur dioxide to sulfur trioxide, sulfur dioxide gas admixed with air or other oxidizing gas in suitable proportions is passed over the particular catalyst employed while maintaining optimum temperature conditions generally prevailing in catalytic conversion operations in the contact process. In one instance, utilizing a vanadium sandstone ore initially ground to pass 300 mesh and analyzing 4% vanadium, expressed as V₂O₅, a catalyst was made which gave an average conversion of a 7–8% sulfur dioxide gas mixture in excess of 96% at temperatures between 440–460° C. In another operation, where a catalyst made in accordance with Example 1 was employed, an average conversion in excess of 95.5% of an 8% sulfur dioxide gas was obtained at temperatures ranging from about 440° to about 460° C. In still another run with the same catalyst, an average conversion of approximately 96% was obtained at temperatures from about 400° to about 480° C.

The invention also includes methods for making catalysts from less finely ground materials by means of which catalysts lower conversions may be obtained. Such catalysts might be used, for example, in the preliminary stages of the conversion operation ahead of the final stage in which are employed catalysts made from the more finely divided material. Examples are as follows:

The ground ore may be made into a sludge, and transformation of vanadium to an active form brought about by an acid treatment. Preferred examples of procedure in accordance with this embodiment of the invention are as follows:

*Example 2.*—To 400 parts of ground vanadium ore passing 100 mesh and containing about 5% vanadium, expressed as V₂O₅, enough water containing 30 parts of 93% sulfuric acid is added to form a sludge, or thick paste. After any chemical reaction has stopped, the excess acid is neutralized with caustic potash. Then 19 parts of potassium sulfate and 20 parts of sodium sulfate are added, and after thorough stirring the sludge is evaporated to dryness. The material may be shaped if desired, and after roasting in an air-oxides of sulfur atmosphere is ready for converter use.

The material also may be shaped by pelleting by compression or by extrusion. While, for example, where the catalyst is to be used for the oxidation of sulfur dioxide, it is not necessary to heat in an air-oxides of sulfur atmosphere before the catalyst is placed in the converter, it is preferred to do so, as the hardened material handles better and there is less dusting and breaking of the material in packing.

*Example 3.*—To a weighed amount of vanadium ore ground to pass 100 mesh, the vanadium content of which is known, dilute hydrochloric acid is added with gentle heating until all evidence of chemical action has ceased. An amount of sufuric acid, slightly in excess of the amount of hydrochloric acid used is then added together with one and one-fourth times each of, as much sodium and potassium sulfates as the vanadium content of the ore, expressed as V₂O₅. The mass is mixed thoroughly and heated, and finally evaporated to SO₃ fumes. The material is cooled and shaped to the desired size, and after roasting in an air-oxides of sulfur atmosphere is ready for converter use.

A similar conversion of vanadium to an active form may be brought about by means of another wet treatment employing initially a water solution made basic with one or more alkalies. The following illustrates one preferred mode of procedure when utilizing this method.

*Example 4.*—To 500 parts of ore, ground to pass 100 mesh and containing about 5% vanadium, reported as $V_2O_5$, 48 parts of 86% potassium hydroxide in solution are added to form a heavy sludge. After thorough mixing, the water is evaporated until the material forms a sticky mass, which is allowed to dry and harden. This material is then sulfated in an air-sulfur dioxide-sulfur trioxide mixture at a low temperature which is gradually increased to about the temperature at which the material will be used in the converter. When cooled and screened to proper size, the material is ready to charge into the converter.

Other examples of catalysts made by methods generally similar to that of Example 1, but using less finely divided materials, are as follows.

*Example 5.*—Mix 500 parts of the ore, containing about 5% vanadium, expressed as $V_2O_5$, and ground to pass through a 100 mesh screen, with 65 parts of potassium sulfate, and roast two hours at a maximum temperature of 780° C. Moisten the cooled material to incipient stickiness with 12 parts of potassium hydroxide in water solution, and allow the material to harden. Treat the hardened material with an air-sulfur dioxide-sulfur trioxide gas mixture, slowly increasing the temperature up to about the temperature at which the material will be used as a catalyst.

*Example 6.*—Mix 500 parts of ore ground to pass 100 mesh containing about 5% vanadium, as $V_2O_5$, with 45 parts of sodium chloride, and heat for one hour from 750–780° C. Cool, and make the cooled mixture into a thick paste with a water solution containing 14 parts of potassium hydroxide. After drying, and permitting the material to harden, heat in air containing preferably less than about 8% of mixed sulfur dioxide and sulfur trioxide, causing the temperature to rise slowly to a final temperature approximately the same as that under which the material will be used in the converter. The properly sized material is ready for use as a catalyst.

Conversion of vanadium to an active condition may also be effected by an initial roasting of the ore, followed by treatment with a water solution of an alkali. Such procedure may be carried out as follows:

*Example 7.*—To 500 parts of ore, containing about 5% vanadium, expressed as $V_2O_5$, and broken down to pass through 3 mesh and remain on 6 mesh and which has been, after sizing, roasted to 780° C.—add 50 parts of potassium hydroxide in a small amount of water. Add the hydroxide solution in portions, or in such a manner that there will be no drip, but at the same time in such a manner that the ore will be thoroughly and uniformly wetted. After air drying, heat in air containing 8–10% of mixed sulfur dioxide and sulfur trioxide, permitting the temperature to rise slowly to approximately the same temperature at which the material will be used in the converter.

The catalysts of the present invention are not limited in use to the catalytic conversion of sulfur dioxide-oxygen gas mixtures, but may be employed in catalytic processes in general, for example in the manufacture of phthalic anhydride, anthraquinone, benzaldehyde, benzoic acid, maleic acid, etc.

I claim:

1. The method of preparing a catalyst from vanadium ore containing less than about 10% vanadium, expressed as $V_2O_5$, in relatively non-catalytically active form which comprises treating the ore with a substance of the group comprising mineral acid and alkali to convert at least some of the vanadium from the state in which it initially exists in the material to a catalytically active form, adding alkali metal compound to the resulting mass, and heating the mass.

2. The method of preparing a catalyst from vanadium ore which comprises treating the ore containing less than about 25% vanadium, expressed as $V_2O_5$, in relatively non-catalytically active form with acid in sufficient quantities to convert at least some of the vanadium from the state in which it initially exists in the ore to a catalytically active form, adding alkali metal compound to the resulting mass, and heating the mass.

3. The method of preparing a catalyst from finely divided silicious vanadium ore containing less than about 10% vanadium, expressed as $V_2O_5$, which comprises treating the ore with hydrochloric acid in sufficient quantities to complete apparent chemical action, adding to the resulting mass sulfuric acid in an amount not substantially less than the quantity of hydrochloric acid initially employed, together with not less than about as much each of sodium and potassium sulfates as is equivalent to the vanadium content of the ore, expressed as $V_2O_5$, heating the mixture to evaporate $SO_3$ fumes, and roasting the resulting material in an oxygen-oxides of sulfur atmosphere.

4. The method of preparing a catalyst from vanadium ore which comprises heating a mixture of the ore and a substance containing an alkali metal compound at a temperature not exceeding that at which incipient fusion of the ore takes place to convert at least some of the vanadium from the state in which it initially exists in the ore to a catalytically active form, cooling the mass, admixing therewith an alkali metal compound containing water solution in such quantities as to make a mass of consistency not thinner than a relatively thick paste, and then drying the mass.

5. The method of preparing a catalyst from a finely divided silicious vanadium ore containing less than about 10% vanadium, expressed as $V_2O_5$, which comprises heating the ore with potassium carbonate at a temperature not substantially exceeding that at which incipient sintering of the ore takes place, cooling the material, adding thereto a solution of potassium hydroxide in sufficient water to make a mass of material of consistency not thinner than a relatively thick paste, drying the material, and heating the material in an oxygen-oxides of sulfur atmosphere.

LEON E. JENKS.